United States Patent [19]

Hassler et al.

[11] 4,375,933
[45] Mar. 8, 1983

[54] CLIP NUT

[75] Inventors: Donald H. Hassler, Fullerton; Paul V. Pagel, Ontario, both of Calif.

[73] Assignee: Microdot Inc., Darien, Conn.

[21] Appl. No.: 178,769

[22] Filed: Aug. 18, 1980

[51] Int. Cl.$^3$ .............................................. F16B 37/04
[52] U.S. Cl. .................................... 411/112; 411/174
[58] Field of Search ................. 411/112, 111, 103, 81, 411/520, 516, 548, 526, 528, 174, 175, 173, 172

[56] References Cited

U.S. PATENT DOCUMENTS

| 2,197,220 | 4/1940 | Kost | 411/528 |
| 2,394,729 | 2/1946 | Tinnerman | 411/112 |
| 4,270,591 | 6/1981 | Gill et al. | 411/112 |

FOREIGN PATENT DOCUMENTS 2418124 10/1975 Fed. Rep. of Germany ...... 411/112

Primary Examiner—Ramon S. Britts
Attorney, Agent, or Firm—Lyman R. Lyon

[57] ABSTRACT

A clip nut assembly for use with thin sheet material which includes a generally D-shaped resilient clip having first and second generally parallel clamping portions biased together by an arcuate biasing strip for clampingly engaging opposite faces of a sheet inserted therebetween. A threaded nut is assembled with the second clamping portion for movement therewith. The biasing strip interconnects one end of the first clamping portion with the opposite end of the second clamping portion. This configuration allows the second clamping portion to pivot about two parallel axes and into parallel alignment with the first clamping portion during insertion of the sheet between the clamping portions to automatically align the nut for receivingly engaging a threaded bolt inserted through the sheet. The biasing strip includes an elongated generally diamond shaped aperture which gives the strip a constant strain geometry. Such a geometry reduces the possibility of permanent yield in any one portion of the clip material during installation.

5 Claims, 6 Drawing Figures

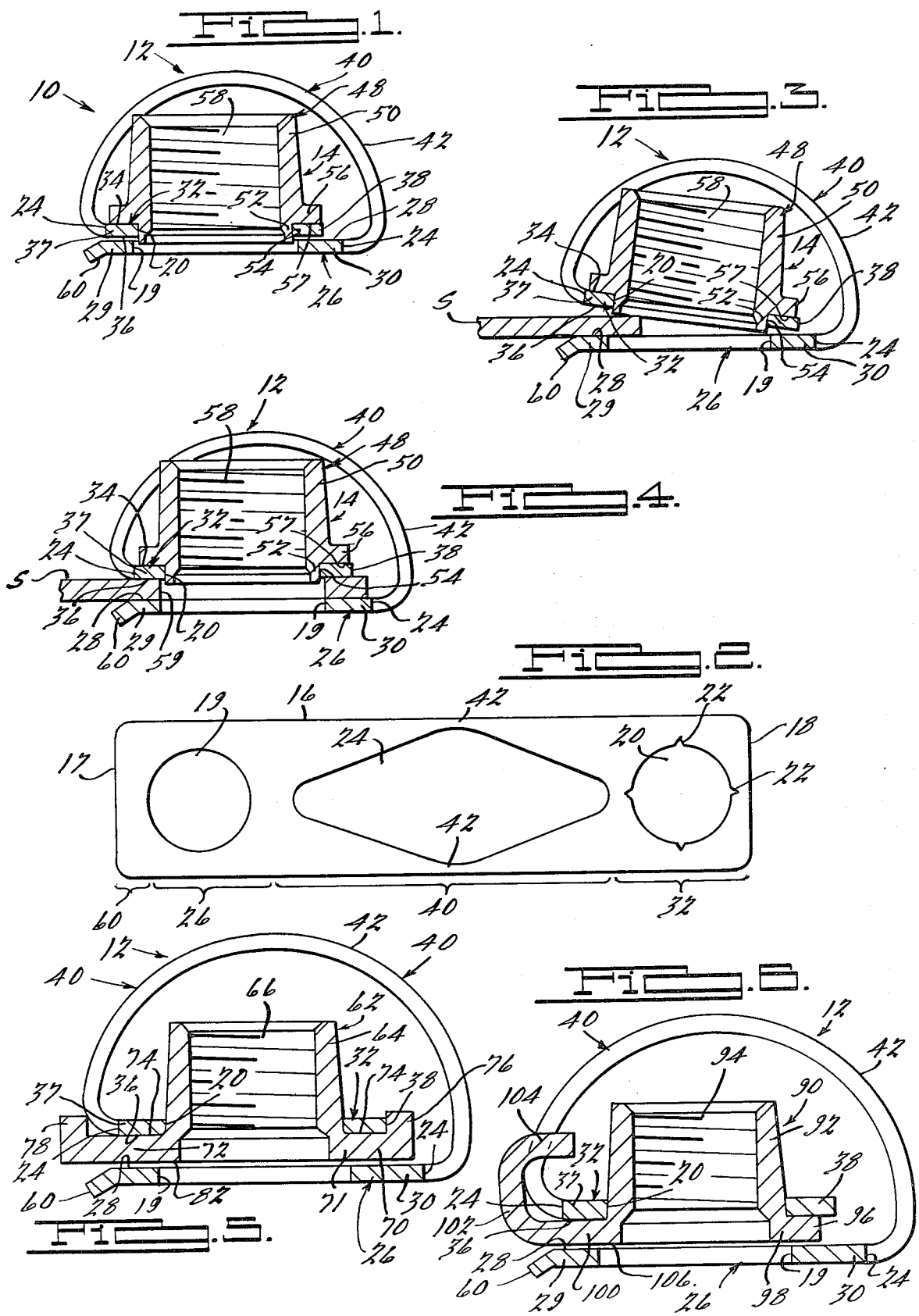

CLIP NUT

BACKGROUND AND SUMMARY OF THE INVENTION

The present invention relates to clip nut assemblies for use with thin sheets having pre-punched holes, and more particularly, to a clip nut assembly having a nut which is self-aligning over a broad range of sheet material thicknesses. The clip portion of the assembly is of a geometry which approaches constant strain so that the possibility of permanent strain or set of the clip portion is reduced.

Prior known clip nut devices include resilient clips of a generally U-shaped configuration. During installation of a U-shaped clip device on a piece of sheet material, one of the clamping portions will deflect and pivot about a single axis located at the bight portion of the U-shaped clip in order to spring load the clip for retaining the device on the sheet. Such U-shaped devices also generally include a threaded nut which is retained for movement with the pivotable clamping portion. For these reasons, such known clip nut devices possess several limitations and disadvantages which reduce their utility and adaptability.

In particular, such devices yield substantial lateral and angular deflection of the nut relative to the sheet when utilized with sheets having thicknesses beyond a certain limit. The design of these devices therefore results in misalignment of the nut relative to the hole in the sheet in such applications. In an attempt to alleviate this inherent problem, some of these devices have provided a nut which is loosely retained, along with means to allow the user to manually pivot the nut back into axial alignment with the hole in the sheet. However, such devices still require threaded bolt installations which are time consuming and tedious in certain ranges of sheet material thickness, and impossible beyond that range.

Such known clip nut devices possess the additional disadvantage of a geometry which results in a permanent set or deformation of portions of the clip if they are utilized with sheet material having a certain threshold thickness. Such a permanent set will reduce the effectiveness of these devices in particular applications, since the clip must remain resilient to exert an effective clamping force on the sheet material. For these reasons, a user of such clip nut devices must stock a substantial inventory of clip nuts of varying size and type in order to accommodate a variety of sheet material applications.

It is, therefore, desirable to provide a clip nut assembly which can be effectively utilized over a greater range of sheet material thicknesses than presently known clip nut devices to allow a user to reduce its inventory of clip nut devices. It is moreover desirable to provide such a clip nut assembly which is self-aligning over its useful range to facilitate installation of threaded bolts utilized therewith. It is additionally desirable to provide such a clip nut assembly which reduces the possibility of permanent yield or set of the clip material so that the device can retain its effectiveness over a broad range of material thicknesses.

The clip nut assembly of the present invention includes a one piece clip which also serves as a nut retaining member. The clip is formed from an elongated piece of spring steel into a generally D-shaped configuration. When placed in this configuration, the clip defines two generally planar clamping portions spaced from and extending substantially parallel to one another, and an arcuate biasing portion which interconnects one end of one clamping portion with the opposite end of the other clamping portion. The biasing portion operates to bias the two clamping portions toward one another to enable these portions to clampingly engage a piece of sheet material inserted therebetween. Each clamping portion is provided with an aperture or hole, each of which is alignable with a pre-punched hole in the sheet material. One of the clamping portions has a threaded nut assembled and fixed for movement therewith. The nut includes a threaded bore which is coaxial with the apertures in the clamping portions.

The configuration of the clip nut assembly enables the clamping portion upon which the nut is assembled to pivot about a first axis defined by the interconnection between the biasing portion and the other clamping portion for positive angular deflection thereof relative to the other clamping portion to accommodate the thickness of a piece of sheet material during initial insertion thereof between the clamping portions. However, as the sheet material is further inserted between the clamping portions, the clamping portion-nut assembly pivots about a second axis defined by the interconnection between the biasing portion and this clamping portion to effect a negative angular deflection of these pieces relative to the other clamping portion. Complete insertion of the sheet material moves these pieces into proper alignment for installation of a threaded bolt. Such a design results in a clip nut configuration having an automatically self-aligning nut, and therefore avoids the disadvantages of nut misalignment associated with previously known devices.

The arcuate biasing portion of the device is provided with a generally diamond shaped aperture intermediate of its ends. This configuration achieves a resilient biasing member having constant strain characteristics. It therefore provides a clip nut assembly which distributes strain more evenly through the biasing portion, so that the assembly can accommodate a broader range of sheet material thicknesses without reaching the permanent yield point of the clip material. As is readily apparent, these features result in a clip nut assembly which can be effectively utilized over a broader range of material thicknesses than previously known devices, and therefore provides a device which allows a user to reduce its inventory of various types and sizes of clip nut devices.

The above and other features of the invention will become apparent from a reading of the detailed description of the preferred embodiments which makes reference to the following set of drawings.

BRIEF DESCRIPTION OF THE DRAWINGS

FIG. 1 is an elevational view, partially in section, of one embodiment of a clip nut assembly in accordance with the present invention.

FIG. 2 is a plan view of the clip portion of this embodiment before it is formed into the configuration shown in FIG. 1.

FIG. 3 is an elevational view, partially in section, of the embodiment shown in FIG. 1, during installation upon a piece of sheet material.

FIG. 4 is an elevational view, partially in section, of the embodiment shown in FIG. 1, as installed on a piece of sheet material.

FIG. 5 is an elevational view, partially in section, of a second embodiment of a clip nut assembly in accordance with the present invention.

FIG. 6 is an elevational view, partially in section, of a third embodiment of a clip nut assembly in accordance with the present invention.

DETAILED DESCRIPTION OF THE PREFERRED EMBODIMENTS

Referring now to the drawings, a first embodiment of a clip nut assembly incorporating the teachings of the present invention is indicated generally at 10. The clip nut assembly 10 includes a resilient clip 12 and a threaded nut 14 adapted to be assembled with clip 12, as described more fully hereinafter.

As shown in FIG. 2, the clip 12 comprises an elongated relatively thin rectangular strip 16 which terminates in ends 17 and 18. The strip 16 is provided with a first aperture or hole 19 adjacent end 17. A second hole or aperture 20 is provided adjacent end 18. This second hole 20 is formed with a series of four notches 22 disposed circumferentially about hole 20 and extending radially outwardly therefrom. As shown in FIG. 2, an elongated generally diamond shaped aperture 24 is formed in strip 16 intermediate of holes 19 and 20. The purpose and function of each of these apertures or holes is described more fully below.

The strip 16 can be made from spring steel or other similar resilient material which is adapted to be bent or formed into the generally D-shaped configuration shown in FIGS. 1, 3 and 4 as clip 12. When so formed, the strip 16 defines a first generally planar clamping portion 26 through which hole 19 extends. As shown in FIG. 1, clamping portion 26 is a thin generally rectangular strip which defines a sheet engaging face 28 along its upper surface and which terminates in ends 29 and 30. The formed strip 16 additionally defines a second generally planar clamping portion 32 through which hole 20 extends. This second clamping portion 32 is a thin generally rectangular strip which defines a nut engaging face 34 along its upper surface and a sheet engaging face 36 along its lower surface. As shown in FIG. 1, clamping portion 32 is spaced from and extends generally parallel to clamping portion 26, and terminates in ends 37 and 38, which are disposed adjacent ends 29 and 30 of clamping portion 26, respectively.

When placed in the D-shaped configuration illustrated as clip 12, the strip 16 defines a resilient arcuate biasing portion 40 which is integrally connected with clamping portion 26 adjacent end 30, and with clamping portion 32 adjacent end 37. The elongated diamond shaped aperture 24 extends along the length of biasing portion 40 between end 30 of clamping portion 26 and end 37 of clamping portion 32. In this configuration, biasing portion 40 effectively defines a pair of arcuate tapering resilient members 42 which diverge in the direction away from ends 30 and 37 of clamping portions 26 and 32, respectively. This biasing portion 40 is operative to bias clamping portions 26 and 32 toward one another for clampingly engaging a thin sheet inserted therebetween in a manner described more fully below.

The nut 14 of this first embodiment of the invention includes a body portion 48 having an elongated cylindrical shank 50 at one end, and a coaxial cylindrical collar 52 at its opposite end which defines an outer peripheral surface 54. The nut 14 also includes a flange 56 which extends radially outwardly and substantially normally of body portion 48 intermediate shank 50 and collar 52. As shown in FIG. 1, flange 56 defines an annular contact surface 57 which is engageable with nut engaging surface 34 of clamping portion 32 upon assembly of nut 14 with clip 12, as described more fully below. The nut 14 also includes an axially extending threaded bore 58 for receiving a complementary threaded bolt or stud.

Nut 14 is assembled with clip 12 by press fitting collar 52 into aperture 20 in clamping portion 32. In this connection, it is to be noted that the diameter of aperture 20 is slightly less than the outer diameter of of collar 52, which enables the outer surface 54 of collar 52 to frictionally engage the wall of aperture 20. The notched configuration of aperture 20 allows this wall to expand elastically upon insertion of collar 52 into aperture 20. This feature enables the wall of aperture 20 to be spring loaded against outer surface 54 of collar 52 to effect an efficient frictional engagement therebetween for retaining nut 14 on clamping portion 32 in the assembled relation shown in the drawings. When the nut 14 is so assembled, the annular contact surface 57 will engage nut engaging surface 34 of clamping portion 32. Both this engagement, and the engagement between collar 52 and aperture 20 serve to locate the nut 14 with respect to the clip 12 so that the threaded bore 58 is coaxially disposed adjacent and immediately above hole 19 in clamping portion 26 to facilitate the reception of a threaded bolt.

When the clip 12 and the nut 14 have been assembled, the resulting clip nut assembly 10 can be utilized as shown in FIGS. 3 and 4. To install the clip nut assembly 10, a thin sheet S is inserted as shown in FIG. 3 between clamping portions 26 and 32. Such initial insertion of sheet S forces clamping portion 32 and nut 14 to pivot about an axis defined by the interconnection between biasing portion 40 and end 30 of clamping portion 26 in order to accommodate the thickness of sheet S, as shown in FIG. 3. As the sheet S is inserted further between clamping portions 26 and 32, the sheet S will effect a pivoting of the assembly of clamping portion 32 and nut 14 about a second axis defined by the interconnection between biasing portion 40 and end 37 of clamping portion 32, resulting in the installation shown in FIG. 4. Stated somewhat differently, initial insertion of the sheet S between clamping portions 26 and 32 forces a positive angular deflection of the assembly of clamping portion 32 and nut 14 relative to clamping portion 26. However, further insertion of the sheet S between clamping portions 26 and 32 will thereafter work a negative angular deflection of clamping portion 32 and nut 14 relative to clamping portion 26. Such negative angular deflection will effectively negate the initial positive angular deflection of these pieces and place clamping portion 32 in parallel alignment with clamping portion 26, as shown in FIG. 4.

The complete insertion of the sheet S also effects pivotal movement of threaded bore 58 of nut 14 into proper axial alignment with the pre-punched hole 59 in sheet S and aperture 19 of clamping portion 26 for installation of a threaded bolt therethrough. Moreover, complete installation of the assembly 10 upon sheet S results in a cumulative axial deflection of clamping portion 32 and nut 14 relative to clamping portion 26 by an amount equal to the thickness of sheet S. This deflection will effectively spring load biasing portion 40 so that it will operate to bias clamping portion 32 toward sheet S and enable clamping portions 26 and 32 to clampingly engage the sheet S for retaining the assembly 10 thereupon.

As is readily apparent, these features of this embodiment of the invention provide a clip nut assembly 10 having several advantages over prior known U-shaped clip nut devices. As previously noted, presently known clip nuts are only useful within a narrow range of sheet material thicknesses since they are designed for angular deflection about a single axis only. They therefore possess the disadvantage of a limited nut alignment capability over a broad range of sheet material thicknesses. In contrast, the D-shaped configuration of clip nut assembly 10 allows angular deflection of the nut 14 about two points of reference. This feature provides an assembly having the advantage of being able to accept sheet thicknesses of a range greater than that possible with prior designs, as well as one wherein the nut 14 is automatically properly aligned upon complete insertion of the sheet S between the clamping portions 26 and 32.

Moreover, the elongated diamond shaped aperture 24 in biasing portion 40 provides a resilient spring member defined by two tapering arcuate members 42 which diverge in a direction from their ends toward their midsections. Each of these arcuate members 42 can be viewed as a first tapering spring member designed for elastic bending about the axis defined by the interconnection between biasing portion 40 and end 30 of clamping portion 26, and a second tapering spring member designed for elastic bending about the axis defined by the interconnection between biasing portion 40 and end 37 of clamping portion 32. Such a geometry gives biasing portion 40 a generally constant strain characteristic so that the possibility of permanent yield or set in a particular portion of biasing member 40 during installation is reduced. In contrast, the generally U-shaped designs of prior known clip nut devices do not provide a geometry which reduces this possibility of permanent yield in the clip portion of these devices. For this reason, the clip nut assembly 10 achieves the advantage of greater adaptability over a broader range of sheet material thicknesses than prior known devices. This feature therefore results in the advantage of allowing a user to reduce its inventory of varying types and sizes of clip nuts necessary to accommodate a broad range of material thicknesses. In this connection, it has been found that a clip nut assembly 10 in accordance with the present invention can accept sheet material thicknesses ranging from 0.020 to 0.250 inches while achieving proper alignment of the threaded bore 58 of nut 14 with the pre-punched hole 59 in the sheet S.

In addition to the previously described features, the clip nut assembly 10 can be provided with additional features which enhance its efficiency and utility. Specifically, during the formation of strip 16 into the clip 12, clamping portion 26 can be provided with an inclined depending guide portion 60 adjacent end 29. This guide portion 60 serves to properly locate sheet S for initial insertion thereof between clamping portions 26 and 32. Furthermore, collar 52 of nut 14 can be provided with an axial length sufficient to extend beyond sheet engaging face 36 of clamping portion 32 so that the end of collar 52 can extend into pre-punched hole 59 of sheet S when moved into the position illustrated in FIG. 4. Such a geometry allows collar 52 to effectively locate and align the clip nut assembly 10 for installation of a threaded bolt through aperture 19 in clamping portion 26, pre-punched hole 59 in sheet S, and threaded bore 58 in nut 14.

A second embodiment of a clip nut assembly in accordance with the invention is shown in FIG. 5. This embodiment includes a nut 62 having an axially extending cylindrical shank 64 provided with a threaded bore 66. The nut 62 is provided with a generally rectangular flange 70 extending substantially perpendicular to the axis of shank 64 adjacent end 71 thereof. Disposed on the opposite side of shank 64 from flange 70 is a second generally rectangular flange 72 which also extends substantially normally of shank 64 adjacent end 71. Flanges 70 and 72 are disposed in the same plane and cooperate to define a contact surface 74. As shown in FIG. 5, flanges 70 and 72 terminate in upwardly extending depending portions 76 and 78, respectively. Depending portion 76 is spaced along flange 70 so that it will abut end 80 of clamping portion 32 upon assembly of nut 62 with clip 12. Similarly, depending portion 78 is spaced along flange 72 so that it will abut biasing portion 40 upon such assembly. The nut 62 is assembled with clip 12 by first inserting shank 64 into and through aperture 20 in clamping portion 32, and thereafter aligning the nut 62 so that contact surface 74 engages face 36 of clamping portion 32, depending portion 76 engages end 38 of clamping portion 32, and depending portion 78 engages biasing portion 40.

Such an assembly provides a clip nut device having an anti-indexing feature, in addition to the previously described advantages. In particular, once the nut 62 has been assembled as shown in FIG. 5, the engagements of depending portion 76 with end 80 of clamping portion 32 and depending portion 78 with biasing portion 40 will operate to prevent rotation of the nut 62 during installation of a threaded bolt therewith. In this embodiment, the flanges 70 and 72 will cooperate with end 71 of shank 64 to provide a sheet engaging surface 82 through which a clamping force is applied to the sheet S for retaining the assembly thereupon.

A third embodiment of a clip nut assembly in accordance with the invention is illustrated in FIG. 6. This third embodiment includes a nut 90 which achieves the anti-indexing feature of the previously described embodiment in a slightly different manner. The nut 90 includes a cylindrical shank portion 92 having an axially extending threaded bore 94. The nut 90 includes a flange 96 extending substantially normally of shank 92 adjacent end 98 thereof. Disposed on the opposite side of shank 92 from flange 96 is a second flange 100 which also extends substantially normally of shank 92 adjacent end 98. This flange 100 includes a depending portion 102 at its outer periphery which terminates in an end portion 104 operative to be receivingly engaged by aperture 24 of biasing portion 40 upon assembly of nut 90 with the clip 12. This third embodiment can be assembled with clamping portion 32 and will operate therewith in a manner similar to that of the previously described embodiment. In particular, this third embodiment achieves an anti-indexing feature by way of the engagement between end portion 104 and aperture 24. Moreover, flanges 96 and 100 will cooperate with end 98 of shank 92 to provide a sheet engaging surface 106 through which a clamping force is applied to the sheet S for retaining the assembly thereupon.

It is understood that the foregoing description is that of the preferred embodiments of the invention and that various changes and modifications may be made thereto without departing from the spirit and scope of the invention, as defined in the appended claims.

What is claimed is:

1. A clip nut assembly for use with thin sheet material, said assembly comprising a substantially planar first clamping portion, a substantially planar second clamping portion spaced from said first clamping portion and extending substantially parallel thereto, a nut fixedly secured to said second clamping portion, said nut including a threaded bore for receiving a complementary threaded bolt, the axis of said bore extending substantially normally of said second clamping portion, and a biasing portion comprising a pair of spaced arcuate members of substantially constant radius for biasing said second clamping portion toward said first clamping portion to enable said first and second clamping portions to clampingly engage a piece of sheet material inserted therebetween, said biasing portion enabling said second clamping portion to pivot about a first axis for positive angular deflection of said second clamping portion relative to said first clamping portion to accommodate the thickness of said sheet material during initial insertion thereof between said first and second clamping portions, and to pivot about a second axis extending substantially parallel to said first axis for negative angular deflection of said second clamping portion relative to said first clamping portion and into parallel alignment with said first clamping portion and said sheet material so that the axis of said bore of said nut extends substantially normally of said first and second clamping portions and said sheet material upon complete insertion of said sheet material between said clamping portions.

2. A clip nut assembly as set forth in claim 1 wherein said first and second clamping portions comprise elongated rectangular parallel strips having first and second ends, the first and second ends of each strip being disposed adjacent one another, and said biasing portion comprises an arcuate member which extends between and interconnects the first end of said first clamping portion and the second end of said second clamping portion.

3. A clip nut assembly as set forth in claim 1 wherein said second clamping portion includes an aperture, and said nut includes an axially extending shank through which said threaded bore extends and a depending flange which extends substantially normally of said shank adjacent one end thereof, said nut being assembled with said second clamping portion by inserting said shank through said aperture and retained on said second clamping portion by the engagement of said shank with said aperture and said depending flange with said second clamping portion.

4. A clip nut assembly as set forth in claim 3 wherein said depending flange is disposed between said first and second clamping portions upon assembly of said nut with said second clamping portion, and is operative to transmit a clamping force from said second clamping portion to said sheet material.

5. A clip nut assembly for installation upon a thin sheet having a pre-punched hole, said assembly comprising first and second clamping portions spaced from one another and operative to clampingly engage opposite faces of said sheet for retaining said assembly on said sheet, each said clamping portion having an aperture which is alignable with said hole to enable insertion of a threaded bolt through said sheet and said clamping portions, a threaded nut which is secured to one of said clamping portions and which is operative to engage said bolt upon insertion through said hole, and an elongated arcuate biasing strip of substantially constant radius which interconnects said clamping portions and which biases said clamping portions together to enable said clamping portions to clampingly engage said opposite faces, said biasing strip including an elongated smoothly contoured generally diamond shaped aperture disposed intermediate its ends which divides said biasing strip into two spaced portions and enables said biasing strip to achieve a generally constant strain along its length.

* * * * *